(12) United States Patent
Nieuwborg et al.

(10) Patent No.: US 7,264,159 B2
(45) Date of Patent: Sep. 4, 2007

(54) DATA ENTRY TERMINAL WITH MANUAL VALIDATION

(75) Inventors: Jan Nieuwborg, Brussels (BE); Jo Uten, Brussels (BE)

(73) Assignee: Banksys S.A., Brussels (BE)

( * ) Notice: Subject to any disclaimer, the term of this patent is extended or adjusted under 35 U.S.C. 154(b) by 148 days.

(21) Appl. No.: 11/253,201

(22) Filed: Oct. 18, 2005

(65) Prior Publication Data
US 2006/0089057 A1    Apr. 27, 2006

(30) Foreign Application Priority Data
Oct. 18, 2004   (EP) .................................. 04105129

(51) Int. Cl.
*G06K 15/00* (2006.01)
(52) U.S. Cl. ....................... 235/383; 235/439; 235/441
(58) Field of Classification Search ................ 235/383, 235/439, 449, 441; 379/447
See application file for complete search history.

(56) References Cited

U.S. PATENT DOCUMENTS 5,748,728 A * 5/1998 Ginsberg et al. ............ 379/447

FOREIGN PATENT DOCUMENTS

| FR | 2 707 407 A | 1/1995 |
|---|---|---|
| FR | 2 773 903 A | 7/1999 |
| WO | WO 96/24942 | 8/1996 |
| WO | WO 00/11622 A | 3/2000 |

* cited by examiner

*Primary Examiner*—Michael G. Lee
*Assistant Examiner*—Kristy A. Haupt
(74) *Attorney, Agent, or Firm*—Akerman Senterfitt

(57) ABSTRACT

The data entry terminal with manual validation includes an upper face having a first portion and a second portion, and a cover being pivotally mounted around a pivot axis between a first position and a second position. The first position is for protecting the keyboard or validation key and the second position is a closed position. The cover includes a front wall having a first edge being substantially at the same level as the upper face of the terminal. When the cover is in first position, the first edge of the front wall of the cover is provided to be positioned above, in particular, upon the second portion, of the terminal, in order to form a shield around the first portion.

18 Claims, 15 Drawing Sheets

DATA ENTRY TERMINAL WITH MANUAL VALIDATION

CROSS-REFERENCE TO RELATED APPLICATION

This application is based on and claims priority from European Application No. 04106129.3 filed 18 Oct. 2004, the entirety of which is hereby incorporated by reference.

BACKGROUND OF THE INVENTION

The present invention relates to a data entry terminal with manual validation, comprising at least a left lateral side and a right lateral side, a front wall and a back wall, an upper face and a lower face, said upper face consisting of a first portion and a second portion, said terminal further comprising means for reading a portable data support, means for manual validation of the data, said means for manual validation of the data being confined in said first portion of the upper face of the terminal, and a cover being pivotally mounted around a pivot axis between a first position and a second position, said first position being a position for protecting the means of validation from being seen by an unauthorised user and said second position being a closed position, said cover comprising at least a first and a second lateral side having each an internal and an external face, said cover further having a front wall having a first and a second edge, said first edge being substantially at the same level as the upper face of the terminal when the cover in said second position and the second edge being substantially at the same level as the lower face of the terminal when the cover is in the second position, said internal face of the first and of the second lateral side having each first engaging means provided to be each engaged in second corresponding engaging means being disposed each on said left and said right lateral side of said terminal, both first and both second engaging means being provided to be aligned together according said pivot axis to allow a mutual rotation around said pivot axis of the cover and of the terminal.

Such a device is known, for example, from the French patent no. 2 707 407. FR 2 707 407 describes a data entry terminal comprising a cover mounted pivotally between a first open position and a second closed position. In the device according to the French patent, when the cover is in a closed position, it covers the validation means, in this case, a keyboard. When in open position, the cover is rotated of less than 90° upwards thereby protecting the means of validation from being seen by the merchandiser.

Unfortunately, such a device as described in the French patent is not easy, nor practical to use and not safe.

Indeed, when the terminal of FR 2 707 407 is used by a merchandiser, the steps are at least the followings:
1. the merchant opens the cover thereby having in his hand a bulky terminal,
2. the merchant inserts the amount to be paid on the keyboard,
3. the merchant returns the bulky terminal with the cover in open position, the user inserts his/her card and enters his/her personal identification number (PIN) while being protected from the merchant's look.

Moreover, the terminal according to FR 2 707 407 is only able to ensure security of the user with regards to the merchandiser when he/she is standing in front of him/her. Indeed, all people standing next to the user can see the personal identification number of the user and accordingly, the terminal of FR 2 707 407 does not respond to the "VISA PIN Entry Device Standard" which imposes a terminal to present a shield in order to mask the hand of a user when entering his/her personal identification number. This condition is found in "The VISA PIN Entry Device Standard" Derived Test requirements, Appendix A—Guidance for the Privacy Screen Design, Version 3.0b of April 2004 which is incorporated herein by reference.

SUMMARY OF THE INVENTION

It is an object of the invention to palliate at least some of these drawbacks by providing a terminal which is compact, easy, and practical to use for the merchants and for the user and which ensures security for this latter while respecting security standard.

To this end, the invention provides a data entry terminal according to the preamble of claim 1, characterised in that said cover is provided to rotate with an angle of more than 90°, preferably more than 145° and most preferably around 180 when rotating from said second position to be in said first position so that the first edge of the front wall is provided to be positioned above said second portion.

By the terms "above", it is meant that the vertical plane passing through the first edge of the front wall has an intersection with the second portion of the terminal.

The terminal according to the invention as mentioned just before provides, when in first open position, lateral edges extending around the keyboard to prevent an unauthorised user from seeing the personal identification number.

The cover of the terminal according to the invention rotates with an angle of more than 90°, preferably more than 145° and most preferably around 180°, so that the first edge of the front wall of the cover will be positioned upon the second portion (anywhere upon the upper face of the terminal except upon the keyboard) of the upper face of the terminal, and the cover forms a shield around said first portion being, for example, the keyboard.

By providing lateral faces for the cover, a shield is formed which preferably rests on the second portion, when the cover is in open position, the terminal according to the invention complies with the security standard by preventing an unauthorised user from seeing the personal identification number of an authorised user when standing next to the user.

In addition, the terminal remains a compact one, when in a closed position, the terminal is not awkwardly shaped or bulky. The terminal is easy and practical to use. For example, the following steps which are more logic and practical are used:
1. the merchant inserts the amount to be paid on the keyboard with the cover in closed position,
2. the merchant opens the cover, the user inserts his/her card and enters his/her personal identification number (PIN) while being protected from the onlookers.

There are only two steps which are more easy, they ask an easier manipulation of the device and thus imply lower risks for the terminal to fall, or break.

In a preferred embodiment, the first edge of the front wall of the cover is provided to be positioned upon said second portion of the upper face of the terminal, in order to form a shield around said first portion.

When the first edge of the front wall of the cover is positioned upon said second portion, i.e. the first edge of the front wall is in contact with the second portion, there remains no space between the first edge of the front wall and the second portion so the merchant can not see what is done on the validation means.

Advantageously, the means for reading a portable data support have a slot on said front wall of the terminal and the second position of the cover is a closed position for protecting said means for reading a portable data support.

Due to the presence of a frontal slot, it is impossible for the merchant to ask the customer to enter his/her PIN without rotating the cover. If the cover remains in the closed position, thereby permitting the keyboard to be visible for the merchant, the card can not be inserted into the slot because the front wall of the cover closes the slot of the reading means. So if the merchant wants to be paid, he has to do the steps as above mentioned:

1. the merchant inserts the amount to be paid on the keyboard with the cover in closed position, 2. the merchant opens the cover to allow the user to insert his or her card into the slot and to enter while being protected from onlookers, his/her personal identification number (PIN).

It is therefore impossible for a merchant to argue that he forgot to open the cover.

Moreover, when the cover is closed, the reading means are protected from dust, dirt, rain, or the like.

In a particularly preferred embodiment, both first and both second engaging means are respectively situated in a most upper part of the lateral sides of the cover and of the terminal.

By providing the engaging means in the most upper parts of the lateral edge, the space needed to allow the rotation of the cover is reduced.

In a preferred embodiment according to the invention, at least one of the first engaging means is a groove for allowing a mutual translation movement between the cover and the terminal.

Thus to open the cover, the merchant has to translate the cover before rotating. This can better prevent accidental opening of the cover.

In a variant, at least one of the second engaging means is a groove for allowing a mutual translation movement between the cover and the terminal.

In order also to better prevent the accidental opening of the cover and to better protect the reading means, in an advantageous embodiment, a protrusion is provided on an inner face of the front wall of said cover, said protrusion being provided to be inserted into said slot when the cover is in said second position.

In a particularly preferred embodiment, the distance between the first engaging means and the front wall of the cover is exactly or at least ½ of the distance between the front wall of the terminal and a rear end of the first portion of the terminal.

When the distance between the first engaging means and the front wall of the cover is greater than ½ of the distance between the front wall of the terminal and the rear end of the first portion of the terminal, the pivot axis is in a rear second half of this first portion and the front wall becomes, when the cover is open, the rear wall, being in a more rear part than the part corresponding to the end of the validation means.

When the distance between the first engaging means and the front wall of the cover is exactly ½ of the distance between the front wall of the terminal and the rear end of the first portion of the terminal, the pivot axis is at the medium of this latter between both halves of the first portion and the rear wall abuts substantially at the end of the keyboard. Thus, the cover permits a better sight of the screen while ensuring a perfect protection of the keyboard from being seen from onlookers.

Advantageously, the lateral sides of the cover, in their front part describe a recess provided to allow the lateral side of the cover, when in open position, to be in the most horizontal position as possible, without any inclination due to the height of the position of the second engaging means.

In a further most particularly preferred embodiment, the lateral sides of the cover comprise each a front edge connected to said front wall, and a rear edge describing a quarter of circle, said quarter of circle being provided to allow the rotation of the cover, from the first position to the second position or inversely, without butting a surface upon which said terminal is placed.

Due to this, when the terminal is placed on a countertop, it is possible to open the cover without butting anything. The quarter of circle is the preferred shape needed for allowing a most terminal point of the lateral side of the cover to be subject to the rotation movement freely gliding without butting anything. Moreover, the rear end describing a quarter of circle allows to ensure a maximal height for the lateral sides which in their turn ensures a maximal safety.

In fact, when the rear end is a perpendicular end in view of the first edge of the lateral side, when a merchant wants to open the cover, the most terminal point along the second edge (intersection between the second edge of the lateral side and the rear end of the lateral side) of the lateral side of the cover will abut the surface on which the terminal is placed and it is therefore impossible to open it without lifting up said terminal. As mentioned before the shape of the rear ends of the lateral sides of the cover ensures a maximal safety by permitting a maximal height for the lateral sides and provides a more practical terminal which should not be lifted up for opening it.

Advantageously, said rear edge describing a quarter of circle is provided to be engaged in a groove having a corresponding shape and being provided upon said lateral side of said terminal.

The groove upon each lateral side of said terminal acts as a guiding means and is provided to help for the rotation of the cover.

Preferably, a spring element is connected to said engaging means, said spring element being provided to allow the cover to stay engaged either in said first position or in said second position.

In a variant, an opening mechanism is further provided to allow to stay engaged either in said first open position or in said second closed position.

Preferably a spring element or an opening mechanism will be provided to prevent the cover to move accidentally to the other position when in one position.

Other embodiments of the device according to the invention are mentioned in the annexed claims.

The present invention also relates to the use of the data entry terminal as a countertop terminal or as a portable terminal.

BRIEF DESCRIPTION OF THE DRAWINGS

Other characteristics and advantages of the invention will appear more clearly in the light of the following description of some particular non-limiting embodiments of the invention, while referring to the figures.

Figure 1:
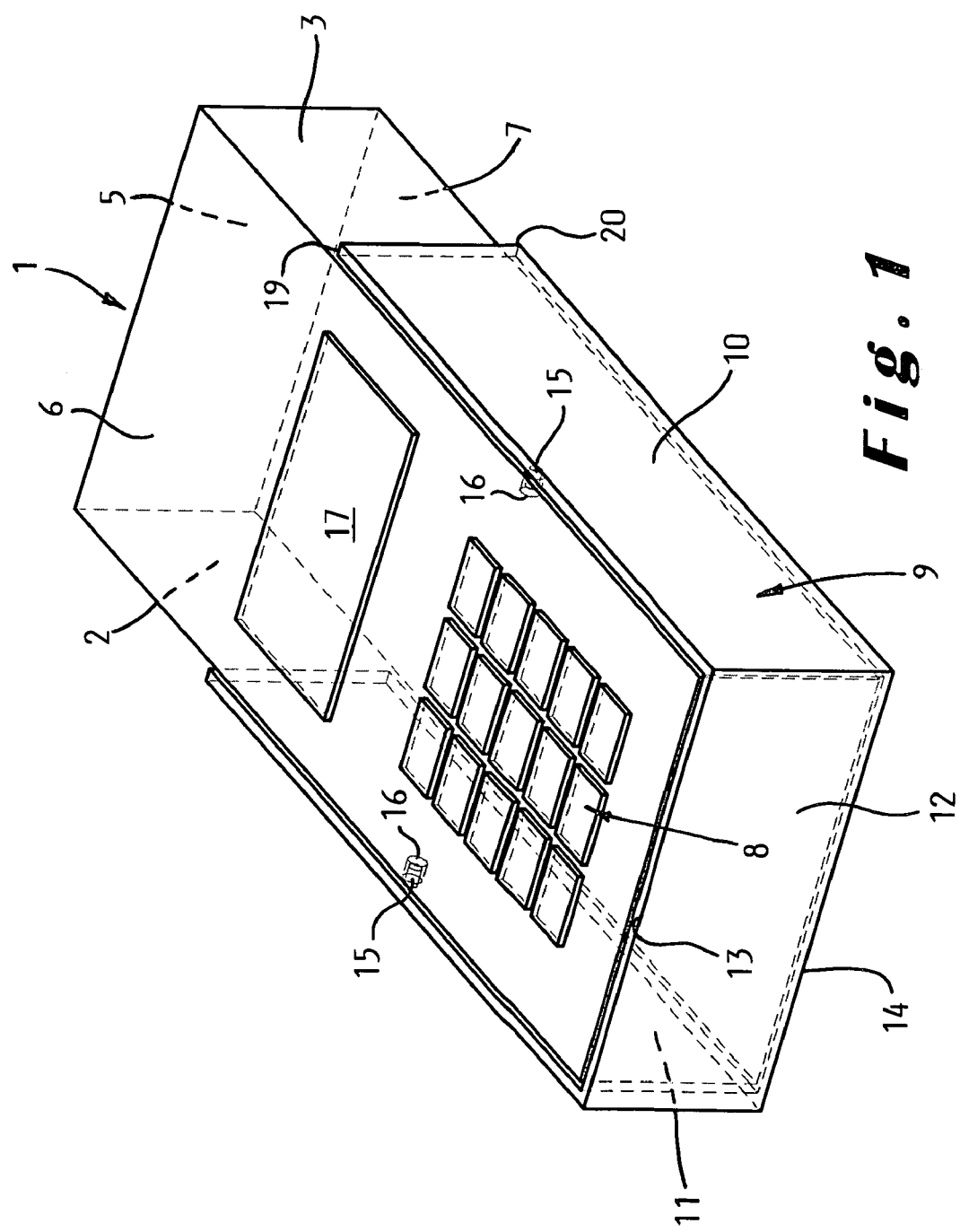
FIG. 1 is a view in perspective of the device according to the invention with the cover in second closed position.

In the drawings, a same reference sign has been allotted to a same or analogous element of the data entry terminal according to the invention.

DETAILED DESCRIPTION

Figure 14:
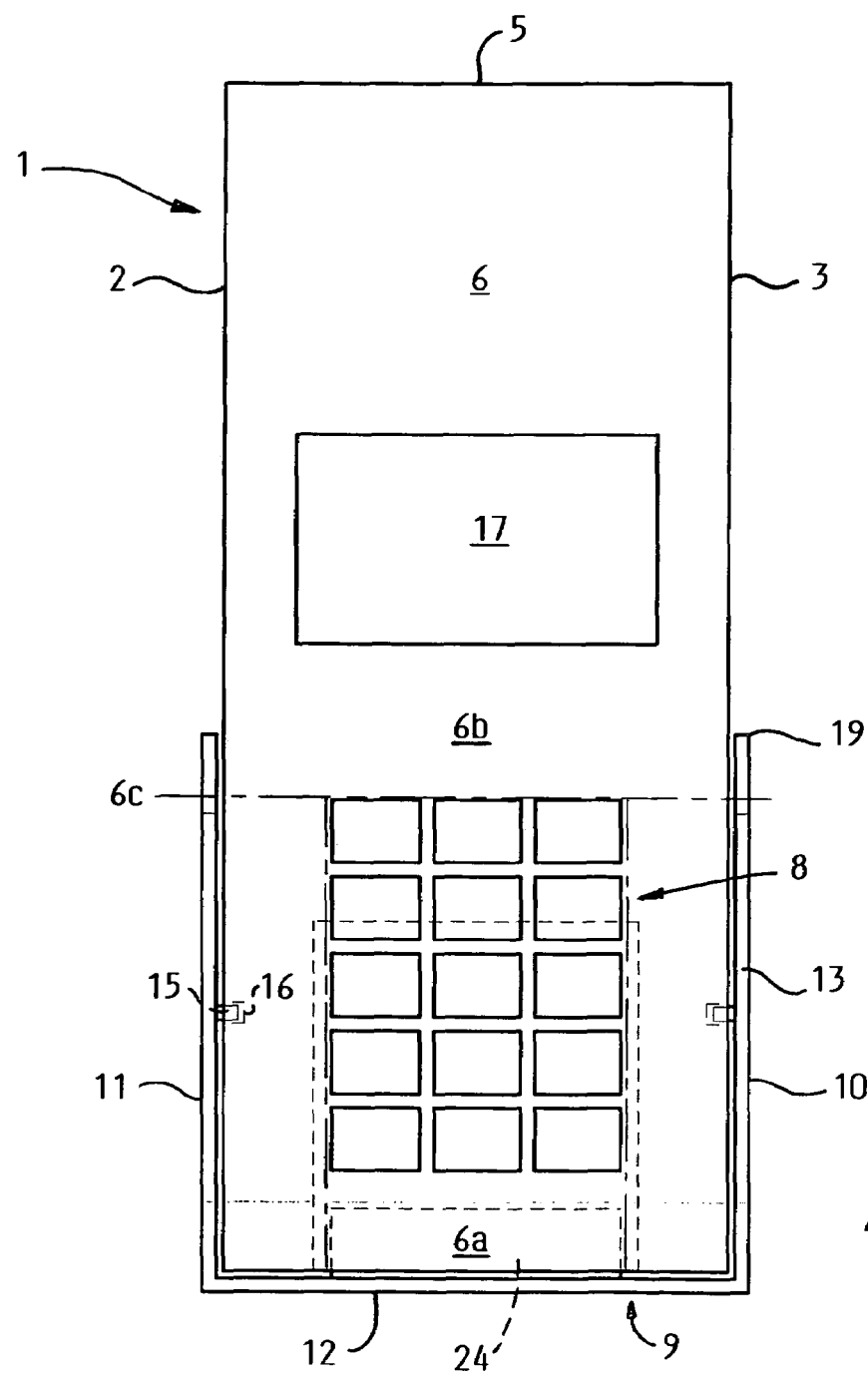
FIG. 14 is a detailed elevation view of the terminal showing the compartimentation the upper face of the terminal comprising a first portion, a second portion and a rear end of the first portion delimiting the first and the second portion in a parallel direction with regards to the pivot axis.

FIG. 1 shows the device 1 according to the invention comprising a left lateral side 2 and a right lateral side 3, a front wall 4 and a back wall 5, an upper face 6 and a lower face 7. As it can be seen at FIG. 14, the upper face 6 of the terminal consisting of a first portion 6a and a second portion 6b. Returning to FIG. 1, the terminal further comprises means for manual validation 8 being confined in said first portion 6a of the upper face 6 of the terminal 1 and a cover 9. The means for manual validation are for example a keyboard 8 which is ended by a rear end 6c (see also FIG. 14) delimiting the first portion 6a of the upper face 6 of the terminal 1. The rear end 6c is in fact, being the limit between the first portion 6a and the second portion 6b and the first portion 6a can be defined as extending from the rear end 6c to the front wall 4 of the terminal. The cover 9 comprises at least a first 10, a second lateral side 11 and a front wall 12 each having a first 13 and a second edge 14. The lateral sides 10,11 of the cover have each a front edge connected to the front wall 12 and a rear edge 25. The first 11 and the second 12 lateral side having each first engaging means 15 provided to be each engaged in second corresponding engaging means 16 being each disposed on said left 2 and said right lateral side 3 of said terminal 1.

The terminal 1 further comprises a screen 17 and optionally additional keys (not shown). It should be understood that means for manual validation can be a keyboard as mentioned before with number or letters, but they can also be an additional biometric identification device like fingerprint identification device, a retina recognition system or the like.

The cover 9 is pivotally mounted around a pivot axis between a first position (open position) and a second position (closed position). In fact the first 16 and the second 15 engaging means are engaged in one other in a aligned manner to form said pivot axis and to allow a mutual rotation around the pivot axis of the cover 9 and of the terminal 1. When the cover 9 is in the second closed position, the first edge 13 is substantially at the same level as the upper face 6 of the terminal 1 and the second edge 14 is substantially at the same level as the lower face 7 of the terminal 1.

Figure 2:
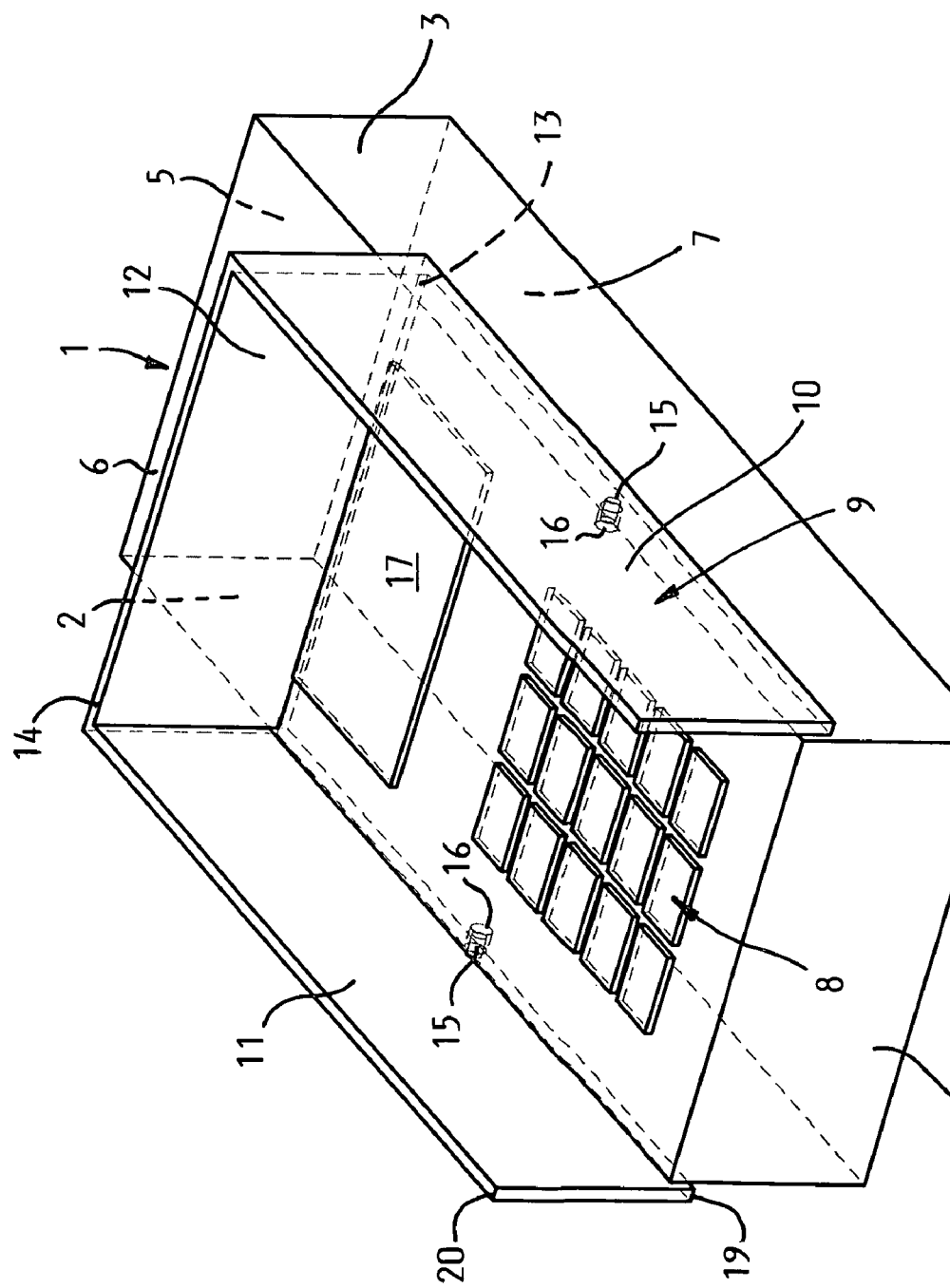
FIG. 2 is a view in perspective of the device according to the invention with the cover in first open position.

FIG. 2 shows the device according to the invention as illustrated in FIG. 1 in the first open position after being rotated around the pivot axis. When the cover 9 is in the first position, it protects the means of validation 8 from being seen by an unauthorised user.

When the cover 9 is in the first open position, the first edge 13 of the front wall 12 of the cover 9 is positioned above said second portion 6b, in particular upon the second portion 6b of the upper face 6 of the terminal 1 and the cover 9 forms a shield around said first portion 6a comprising the keyboard 8. The second edge 14 of the cover is now, when in the open position, the upper edge.

The person skilled in the art will understand that the cover 9 is rotated with an angle greater than 90°, and preferably greater than 145° and most preferably around 180°.

In this embodiment, the cover 9, when in open position, protects also the screen 17 from being seen by an unauthorised user.

Figure 3:
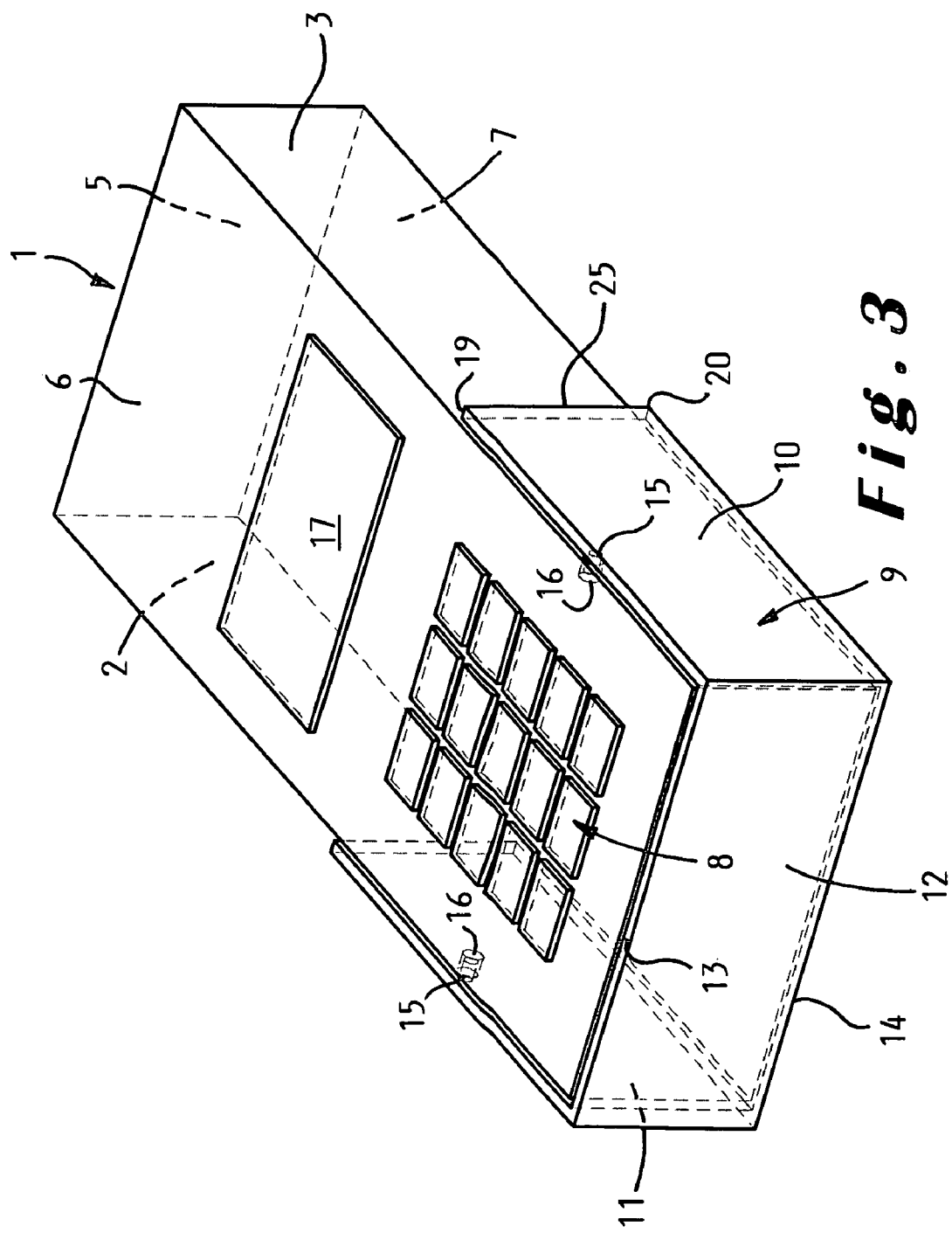
FIG. 3 is a view in perspective of the device according to the invention with the cover in second closed position wherein the distance between the first engaging means and the front wall of the cover is exactly ½ of the distance between the front wall of the terminal and a rear end of the first portion of the terminal.

FIG. 3 illustrates a particular embodiment where the distance between the first engaging means 15 and the front wall 12 of the cover 9 is exactly ½ of distance of the distance between the front wall 4 of the terminal 1 and a rear end 6c of the first portion 6a of the terminal 1.

FIG. 3 illustrates the cover 9 in a closed position, which is the position either when the terminal 1 is not used or used for the first step, being, as mentioned previously, when the merchant inserts the amount to be paid on the keyboard 8.

Figure 4:
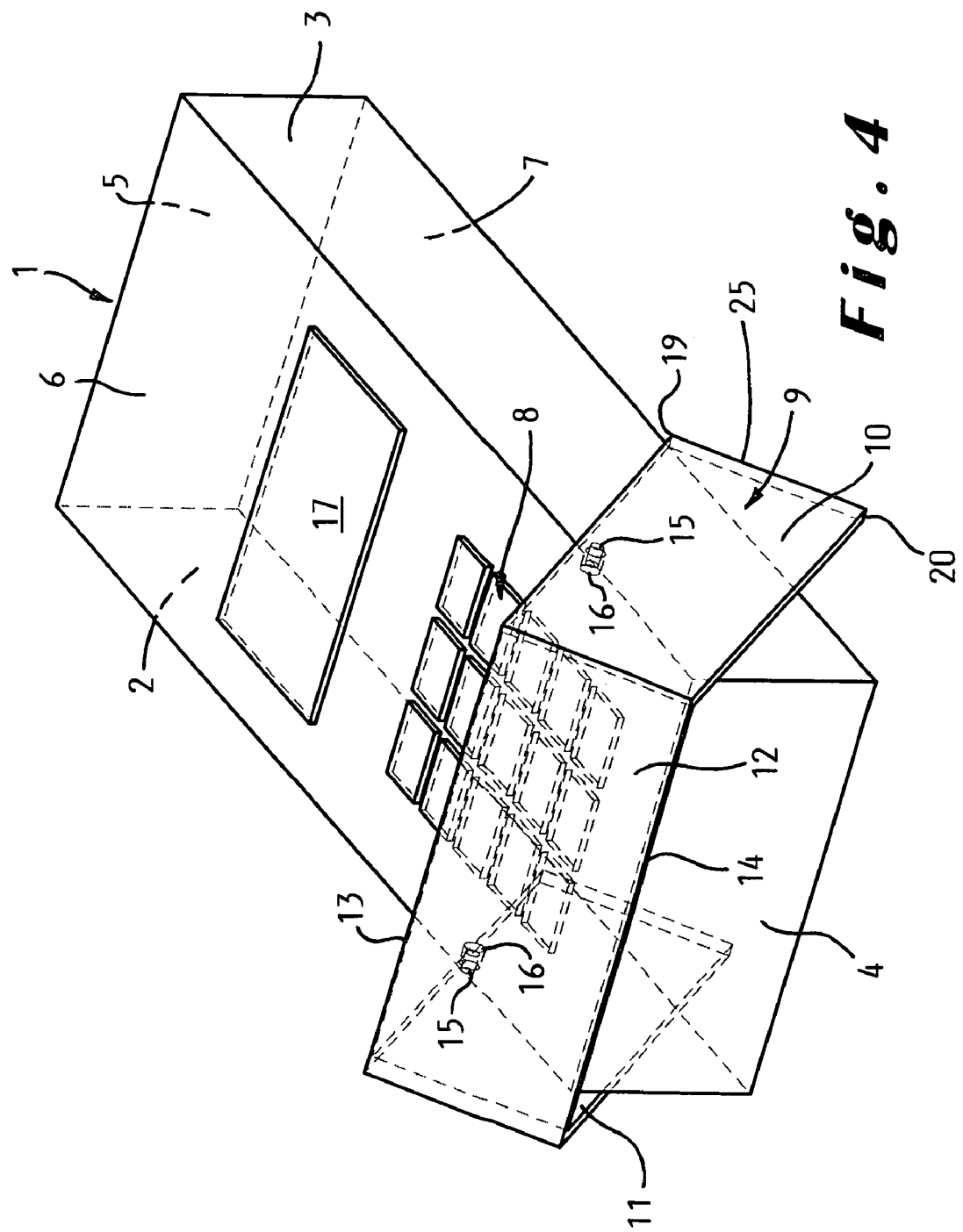
FIG. 4 is a view in perspective of the device according to the device shown in FIG. 3 illustrating the opening or the closing of the cover.
Figure 5:
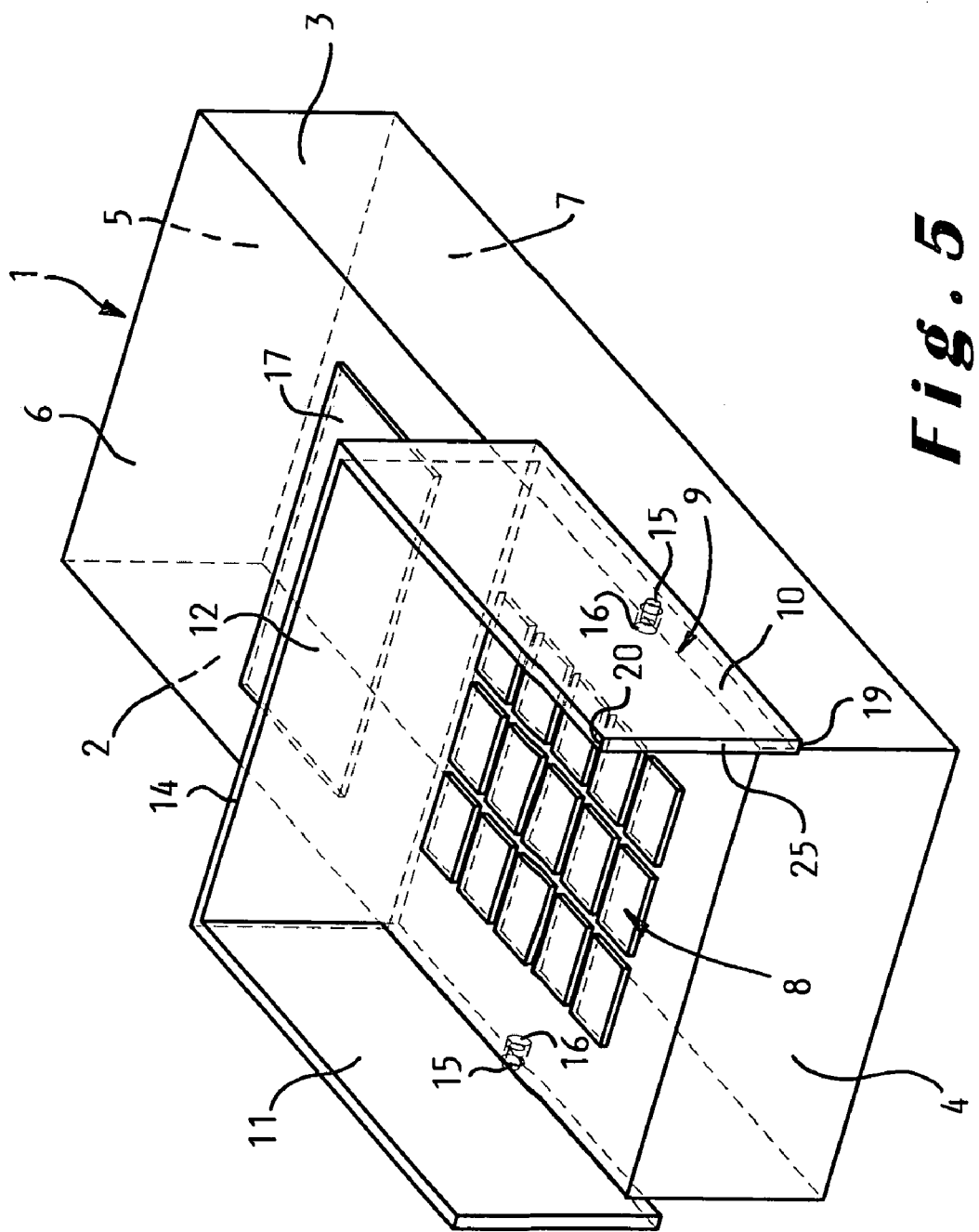
FIG. 5 is a view in perspective of the device according to the device shown in FIG. 3 illustrating the cover in the first open position

FIG. 4 shows the opening or the closing action of the terminal 1 of this particular embodiment. As it can be seen, the cover 9 is closed or opened with a rotation movement which is completed when the first edge 13 of the cover 9 rests on the second portion 6b of the upper face 6 of the terminal (FIG. 5). In this embodiment, the front wall 12 of the cover reaches the rear end 6c of the first portion 6a of the upper face 6 of the terminal 1 when the cover 9 is opened, thereby becoming the rear wall 12 of the shield 9.

Figure 6:
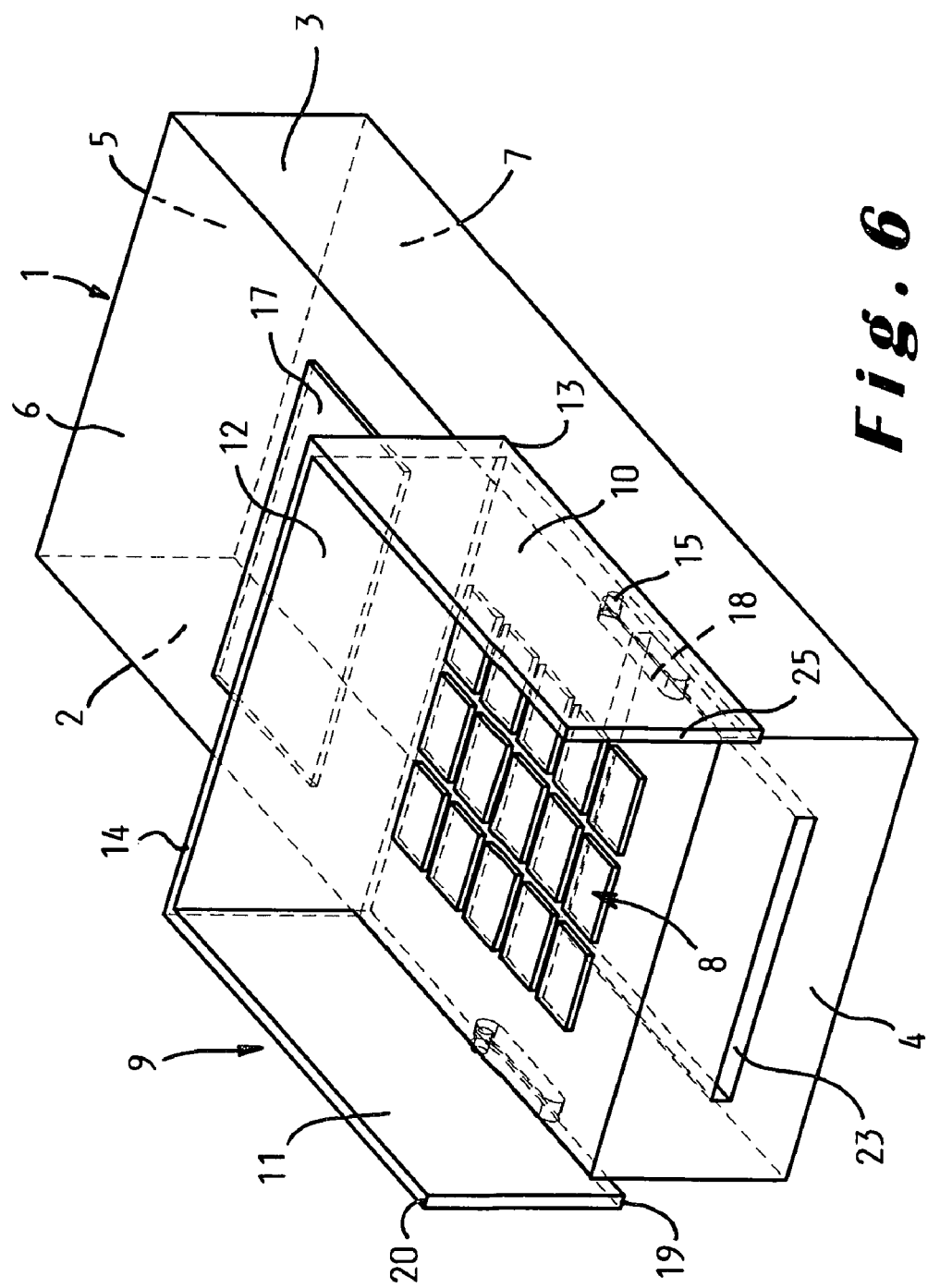
FIG. 6 is a view in perspective of an embodiment according to the invention wherein the lateral side of the terminal comprises a substantially horizontal groove as engaging means.

As it can be seen on FIG. 5 or 6, when the cover is in the first open position, a rotation of this latter of nearly 180° was performed. Because the distance between the first engaging means 15 and the front wall 12 of the cover 9 is exactly ½ of the distance between the front wall (4) of the terminal 1 and a rear end 6c of the first portion 6a of the terminal 1, the front wall 12 became the rear wall 12 of the protecting shield. The first edge 13 of the rear wall 12 is just situated on the second portion 6b of the upper face 6 of the terminal 1, close to the first portion 6a and substantially at the end of the keyboard 8.

This embodiment also allows the merchant to see the screen 17 of the terminal 1 and provides a shield that more closely surrounds the keyboard 8.

FIG. 6 shows a particular embodiment according to the invention wherein the lateral side 2,3 of the terminal 1 comprises a substantially horizontal groove 18 as engaging means 16.

It should be understood by those skilled in the art that the groove 18 could also be placed on the lateral side 10,11 of the cover 9 as the first and the second engaging means (15, 16) could also be in each embodiment inverted. Moreover, it should be understood that, at the left of the terminal 1, a groove 18 can be provided on the left lateral side 2 of the terminal 1 and a protrusion 15 can be provided on the lateral left side 11 of the cover 9 while at the right lateral side 3 of the terminal 2 a protrusion can be provided and a groove can be provided on the lateral right side 10 of the cover 9, or inversely.

As illustrated, the groove of this particular embodiment is substantially horizontal, but it can also be inclined with an angle comprised in the range of 1 to 359°. The groove has at least two particular advantages. Firstly, the groove is provided to reduce accidental rotations of the cover which occurs, for example, when the terminal is used as a portable terminal and is placed in the pocket of the merchandiser. Secondly, namely when the terminal is used as a countertop terminal, it could be interesting to have an inclined groove to prevent that a most terminal point 19 along the first edge 13 (or a most terminal point 20 along the second edge 14 ) of the cover 9, for example, abuts a surface on which the terminal 1 rests. If the groove 18 has an angle, for example, in the range from 1 to 179°, preferably in the range from 15° to 165°, most preferably from 15° to 75°, the merchant has to lift the cover 9 up before rotating it thereby preventing the end 19,20 of the cover 9 to abut the surface on which the terminal 1 is placed.

Figure 7:
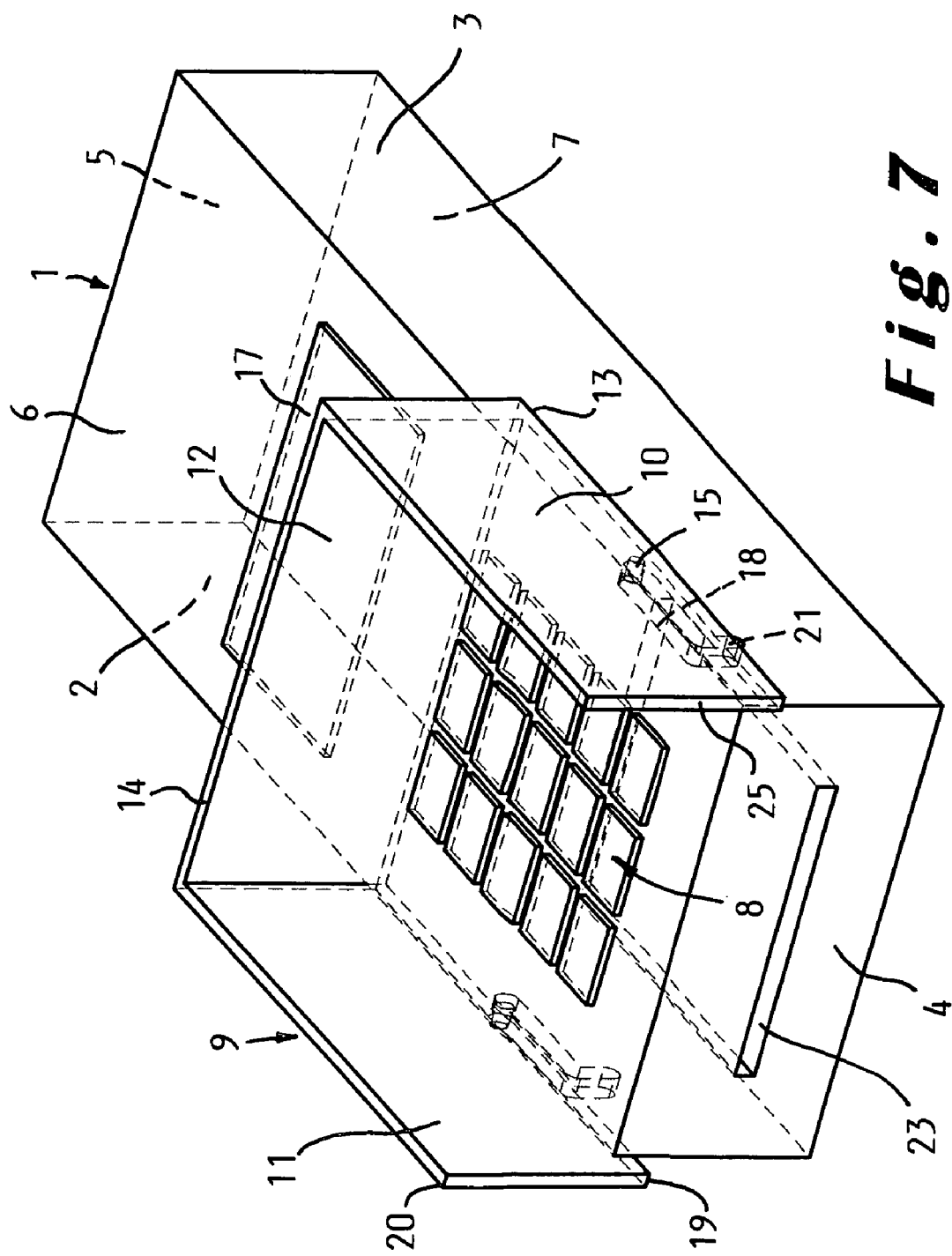
FIG. 7 is a view in perspective of a preferred embodiment according to the invention wherein the groove is ended in the front part by a nick.

In a variant of what is shown at FIG. 6, a nick 21, or other equivalent blocking means, could be provided at the frontal end of the groove (FIG. 7), at the rear end of the groove (FIG. 8) or both (not shown).

The nick 21 will act as a blocking means and a pivot point. If the nick 21 is provided at the frontal end of the groove 18, the cover 9 should firstly be translated from its closed position frontwardly, then it would be engaged in the nick 21 which simplifies the rotation by providing a little cavity acting as a blocking means in which the protrusion 15 (for example, the engaging means 15 on the internal face of the lateral side 10,11 of the cover 9) will be accommodated and will rotate. The nick 21 serves thereby as a support and blocking means to help for the rotation while stopping any translation of the cover 9. After the rotation of the cover, a further translation is performed in the same groove 18 or optionally in another one 18' (not shown) to place the cover in its open position.

The groove 18 (of FIGS. 7 and 8) can be as mentioned before in the explanation of FIG. 7 inclined with an angle comprised in the indicated range.

The groove 18' can be similar in shape, size, direction, orientation, inclination or different.

Figure 8:
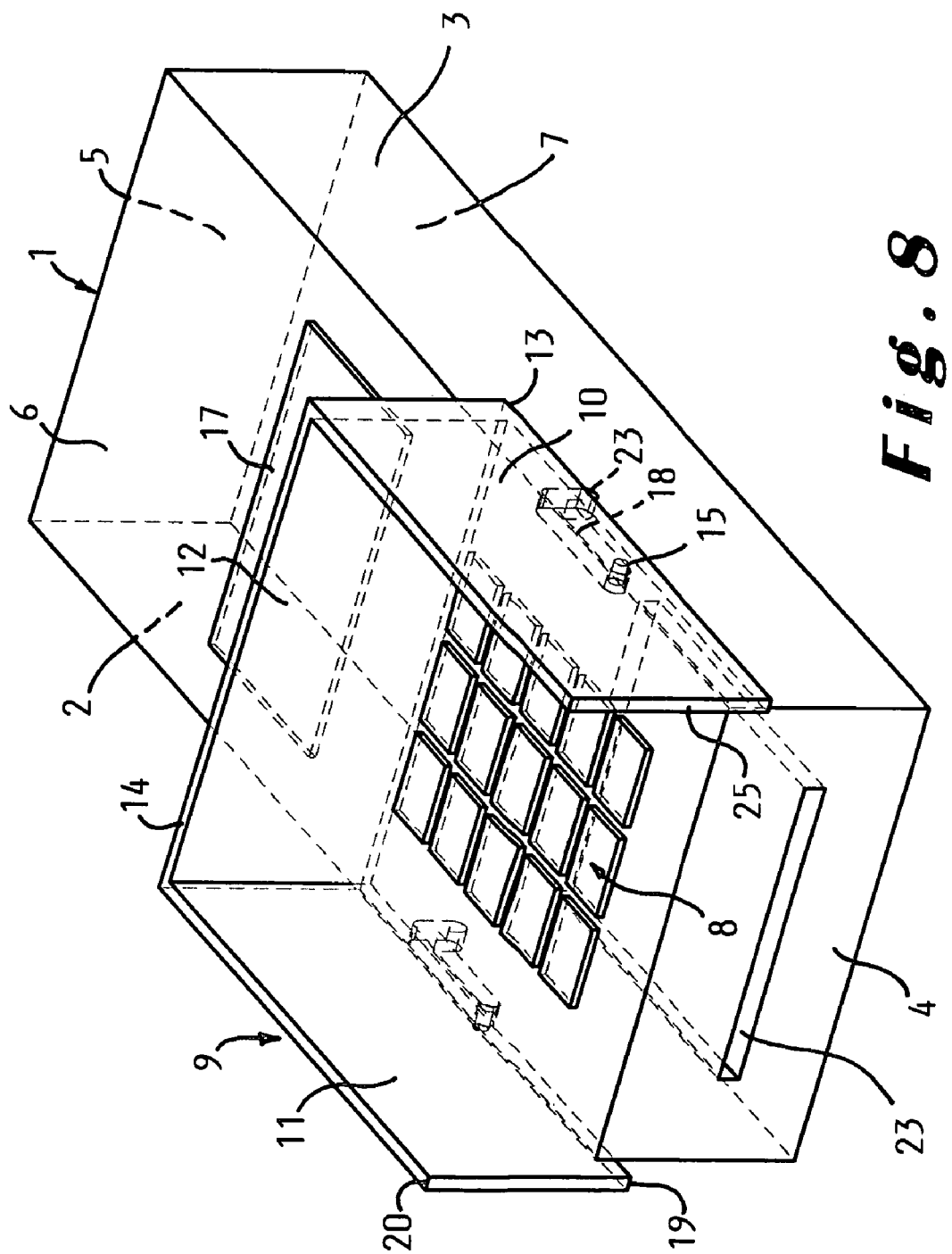
FIG. 8 is a view in perspective of a preferred embodiment of the cover according to the invention wherein the groove is ended in the rear part by a nick.

In a similar manner, as shown at FIG. 8, the nick 21 is provided at the rear end of the groove 18. Thus, as the protrusion 15 is accommodated in the nick 21 when the cover is closed, the cover 9 should firstly be rotated from its closed position with an angle of about 180°. Then it would be translated along the groove 18 to place the cover 9 in its open and safe position in order to form said shield.

It should be understood that all the movements and all engaging means 15,16 are mutual, so, although the groove is described herein as being in the terminal 1 and the protrusion on the cover 9, the contrary is also true. It is clear for those skilled in the art that the protrusion can also be found on the lateral sides 2,3 of the terminal 1 and the groove on the lateral side 10,11 of the cover 9. Moreover, it should be understood that, at the left of the terminal, a groove 18 can be provided on the left lateral side 2 of the terminal 1 and a protrusion 15 can be provided on the lateral left side 11 of the cover 9 while at the right lateral side 3 of the terminal 2 a protrusion can be provided and a groove can be provided on the lateral right side 10 of the cover 9, or inversely.

Figure 9:
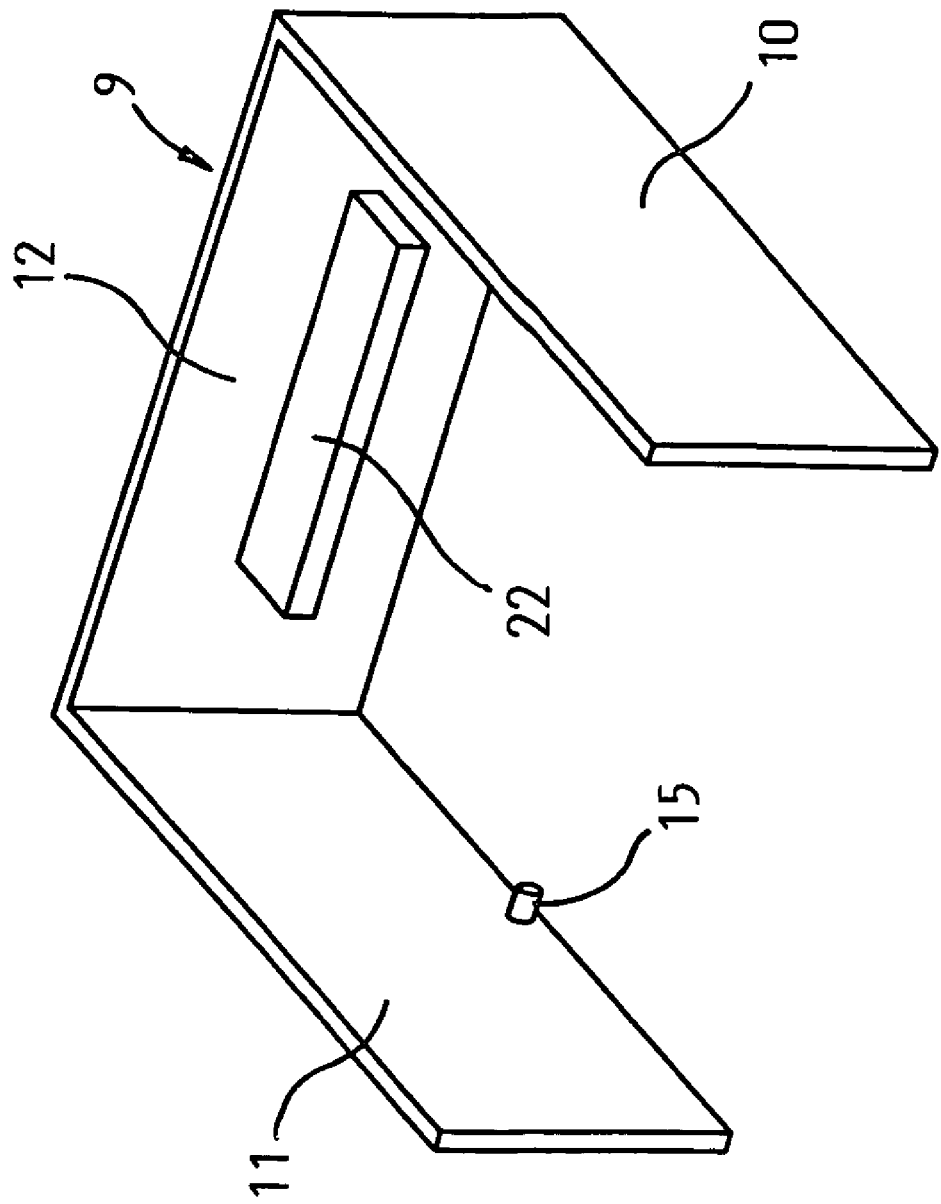
FIG. 9 is a view in perspective of a preferred embodiment according to the invention wherein a protrusion is provided in the inner face of the front wall of the cover.

An advantageous embodiment is depicted at FIG. 9 in which it can be seen that a protrusion 22 is provided on an inner face of the front wall 12 of the cover 9. The protrusion 22 is provided to be inserted into the slot 23 (for example shown at FIGS. 6, 7, and 8) of the reading means of the terminal 1 when the cover is in the closed second position.

Figure 10:
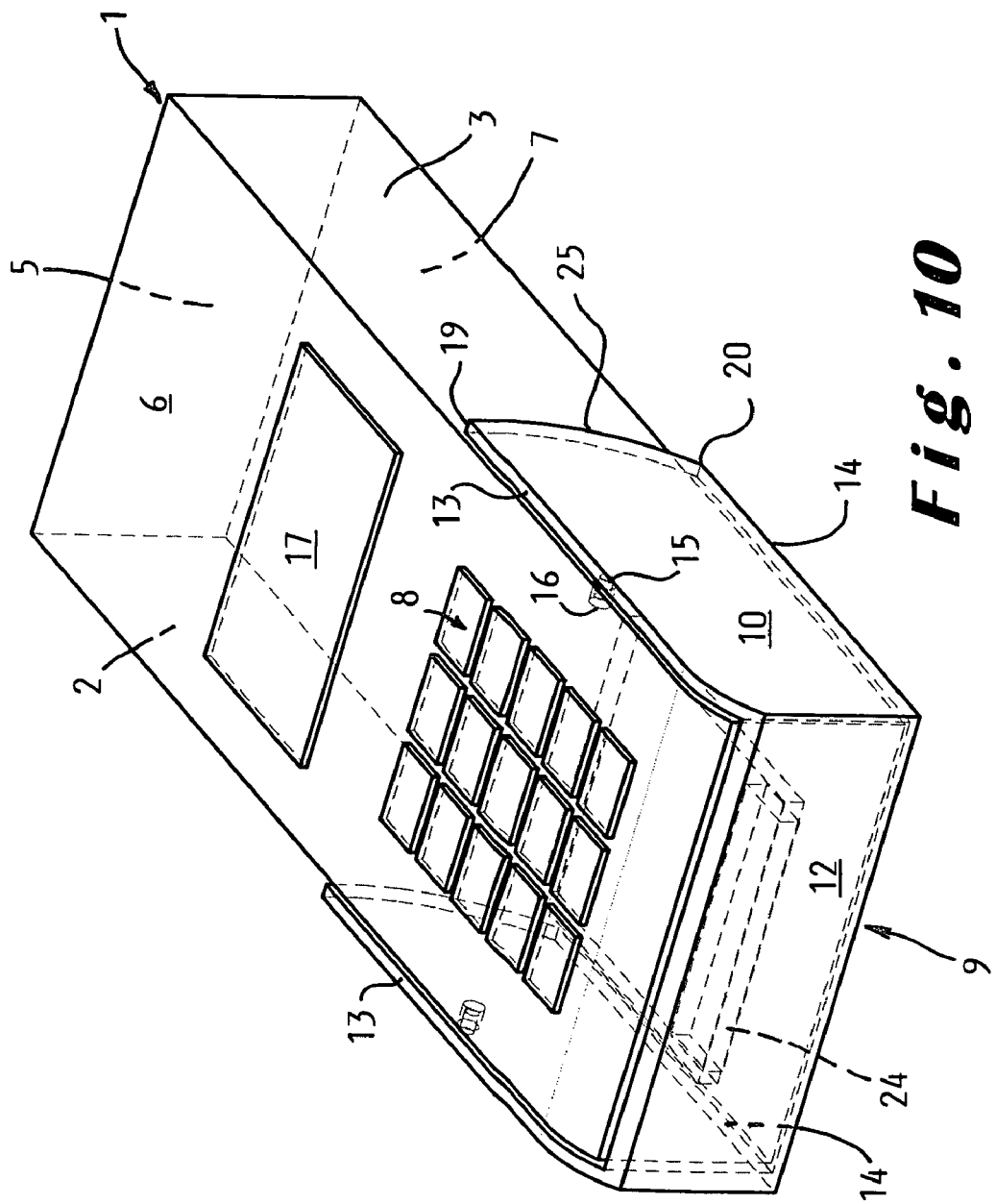
FIG. 10 is a view in perspective of the device according to the invention with the cover in second closed position wherein the distance between the first engaging means and the front wall of the cover is exactly ½ of the distance between the front wall of the terminal and a rear end of the first portion of the terminal and wherein the rear ends of the lateral side of the cover describe a quarter of circle.

At FIG. 10 is depicted the device 1 according to the invention in the most preferred embodiment, with the cover 9 in second closed position, wherein the distance between the first engaging means 15 and the front wall 12 of the cover 9 is substantially exactly ½ of the distance between the front wall 4 of the terminal 1 and a rear end 6c of the first portion 6a of the terminal and wherein the rear ends 25 of the lateral side 10,11 of the cover 9 describe a quarter of circle. Moreover, the lateral sides 10,11 of the cover 9, in their front part describe a recess 30 provided to allow the lateral side 10,11 of the cover 9, when in open position, to be in the most horizontal position as possible, without any inclination due to the height of the position of the protrusion 15.

Figure 11:
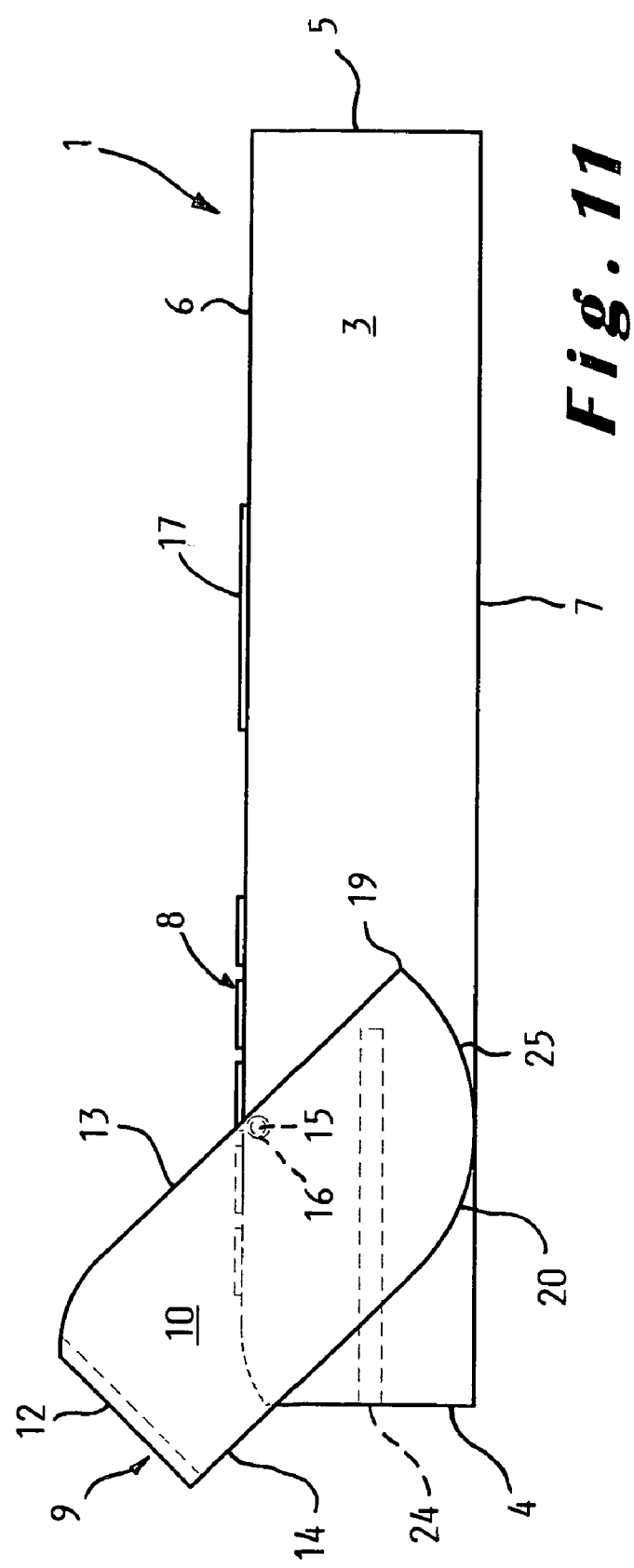
FIG. 11 is a lateral view in perspective of the device according to the device shown in FIG. 10 illustrating the opening or the closing of the cover.

As it can be seen at FIG. 11, during the opening of the cover 9 in order to put the cover in the open position (FIG. 12), due to the shape of the rear ends 25 describing a quarter of circle, the most terminal point 20 will never abut the surface on which the terminal 1 is disposed thereby allowing the terminal 1 to stay in place when the cover 9 should be opened. This minimises the risks of breaking, falling, etc. by providing a reduce handling when using the terminal 1. Moreover, the rear ends 25 describing a quarter of circle of the lateral sides 10,11 allow to ensure a maximal high for the lateral sides 10,11 which in their turn ensures a maximal safety while providing a useful terminal.

Figure 12:
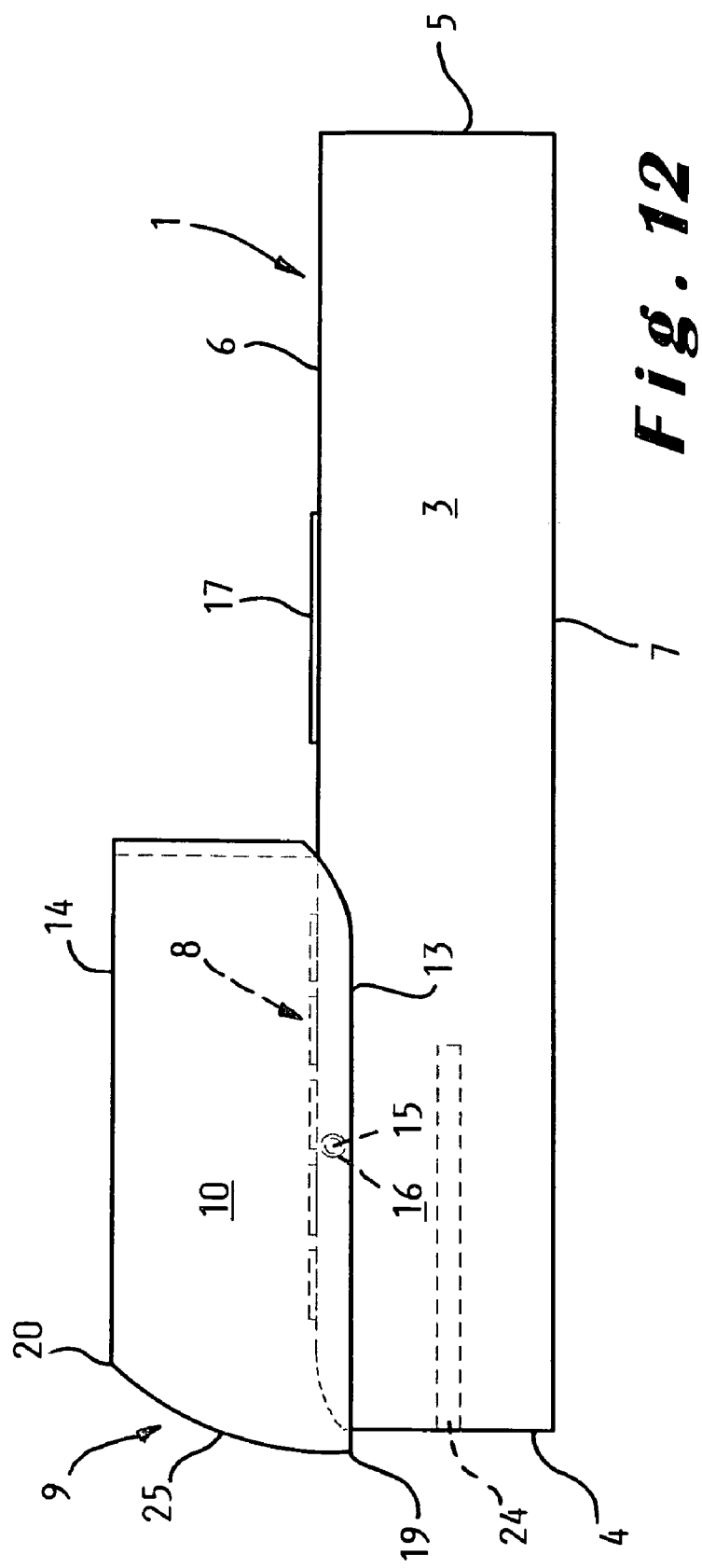
FIG. 12 is a lateral view of the device according to the device shown in FIG. 10 illustrating the cover in the first open position.

FIG. 12 illustrated particularly the utility of the recess 30 provided in the front part of the cover to allow the lateral side 10,11 of the cover 9, when in open position, to be in the most horizontal position as possible, without any inclination due to the height of the position of the protrusion 15. The edge 13 of the front wall 12 of the cover 9 rests just on the rear part 6c of the upper part 6 of the terminal without any space between the edge 13 and the upper face 6, thereby providing a better safety for the shield around the keyboard 8 of the terminal according to the invention.

Figure 13:
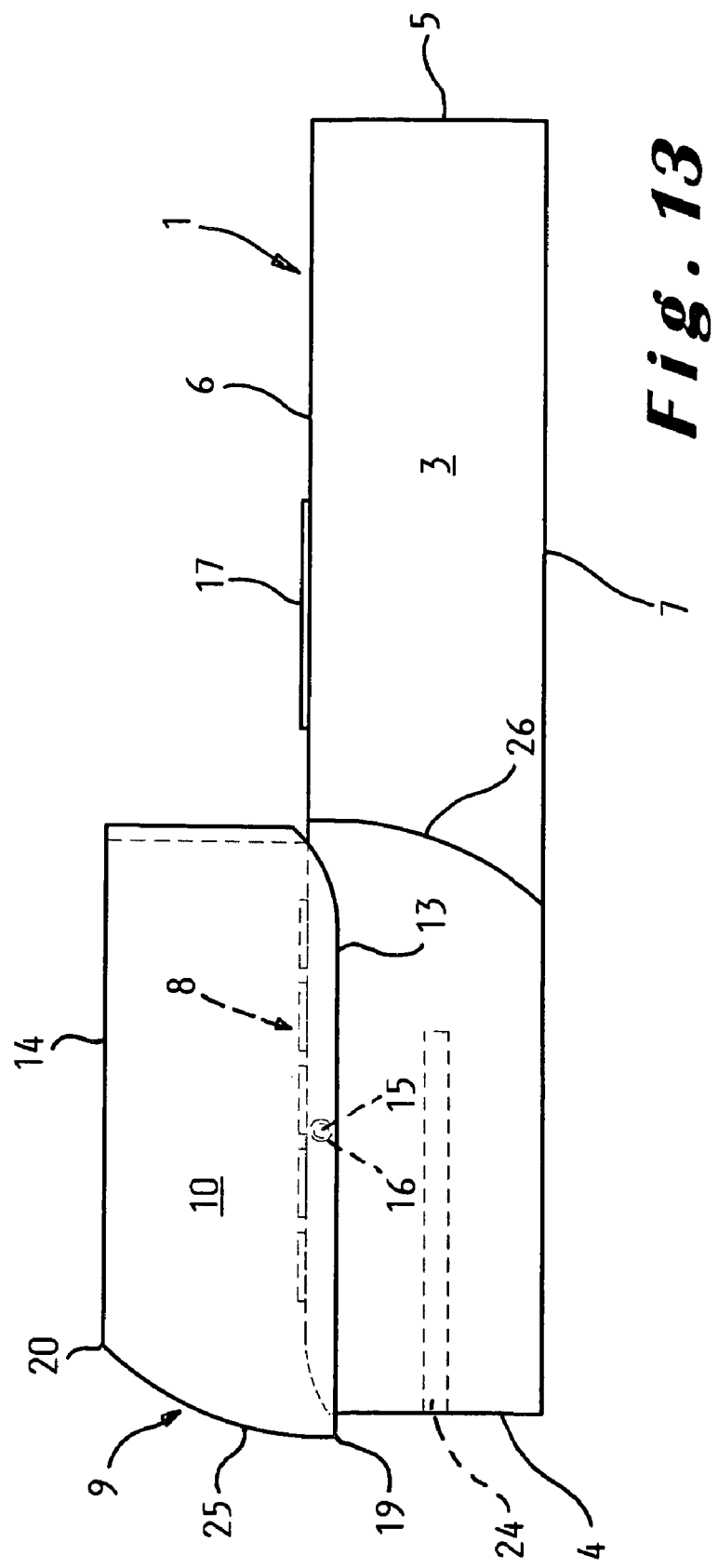
FIG. 13 is a lateral view of the device according to the invention with the cover in first open position wherein the distance between the first engaging means and the front wall of the cover is exactly ½ of the distance between the front wall of the terminal and a rear end of the first portion of the terminal, wherein the rear ends of the lateral side of the cover describe a quarter of circle and wherein the lateral sides of the terminal are each provided with a groove describing a correspondent quarter of circle.

Advantageously, as illustrated at FIG. 13, a groove 26 could be provided on the lateral side 2,3 of the terminal 1. The groove 26 describes a quarter of circle correspondent to the quarter of circle of the rear ends 25 of the lateral sides 10, 11 of the cover 9. The groove 26 will be aimed for guiding the ends 25 of the lateral side 10, 11 of the cover 9 when rotating around the pivot axis, which is aligned with the engaging means 15, 16, and for supporting the most terminal points 19,20 of the edges 13, 14.

It should be envisaged that the shape of the groove 26 and of the rear ends 25 of the lateral sides 10, 11 of the cover 9 could be different, although the quarter of circle shape is the most preferred shape.

In view of the preceding explanation, the steps to use the terminal are the followings:

1. the merchant inserts the amount to be paid on the keyboard 8 with the cover 9 in closed position, 2. the merchant opens the cover 9 to allow the user to insert his or her card into the slot 24 and to enter while being protected from onlookers, his/her personal identification number (PIN).

The terminal according to the invention is very safe while being practical in view of the terminal of the prior art. Indeed, in the case of a countertop terminal, the possibility to let the cover in a closed position while introducing the amount to be paid is a very practical possibility which simplifies a lot the transaction for the merchant.

The second step prevents the client to enter his PIN when the cover is in the closed position. It is therefore impossible to introduce the PIN without the protecting shield with the cover is in the closed position, since the access to the slot is blocked therefore not allowing the card to be inserted.

The shield provided according to the invention is a very safe shield with lateral edges which protect the introduction of the personal identification number from being seen by onlookers.

Figure 15:
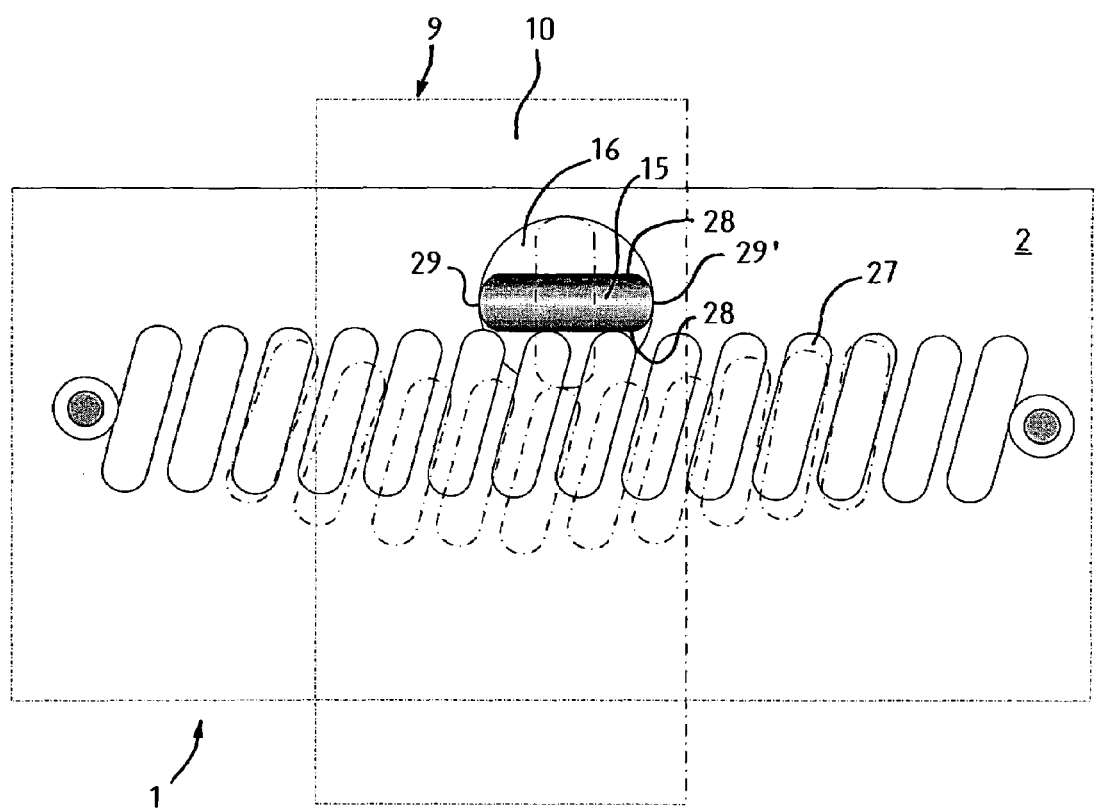
FIG. 15 is a detailed view of an optional opening mechanism for the cover of the terminal.

As it can be seen at FIG. 15, a spring element 27 is further provided upon a lateral side 2,3 of the terminal 1. The spring element 27 can also be provided on both lateral sides 2,3 of the terminal 1. The spring element 27 is provided for forcing the cover 9 to stay engaged either in said first open position or in said second closed position and to prevent accidental openings of the cover 9.

The protrusion 15, being here provided upon the inner face of the lateral side 10,11 of the cover 9, have a particular shape provided to resist to a movement at the beginning of an opening and a closing movement. To this end, the external area of protrusion 15 presents four peripheral part (28,28', 29, 29') which are a flat upper face 28 and a flat lower face 28' and a right 29 and a left circular part 29'. The protrusion 15 is aimed for being engaged in the corresponding engaging means 16 on the lateral side of the terminal. The corresponding engaging means 16 should preferably be a substantially circular cavity provided to allow the rotation of the protrusion 15 having this particular shape.

The spring element 27 is preferably as illustrated at FIG. 15, a longitudinal spring element 27 extending in a parallel manner in view of the direction perpendicular to the pivot axis placed on the lateral sides 2,3 of the terminal 1.

For obtaining the protrusion 15 of this particular shape, it could be appropriate to add a piece of the required shape around the original first engaging means 15 such as a nut or equivalent or to manufacture directly to cover 9 with this protrusion 15

When the cover 9 is open, the upper flat part 28 of the protrusion 15 is towards the longitudinal spring element 27. When the merchandiser, the merchant or the user rotates the cover 9 to close the terminal 1, the upper flat surface 28 of the protrusion 15 will exert a resistance against the rotation since the upper surface 28 is in an inclined position and pushes towards the longitudinal spring element 27.

During the closing movement, when this resistance point is passed, the upper face 28 of the protrusion 15 has a little rotated and the spring element 27 is contacted a circular part 29 of the protrusion 15. The circular part 29 of the protrusion 15 glides upon the spring element 27 due to its shape and the cover closes relatively freely.

At the end of the closing movement, when the circular part 29 is ended, the lower flat part 28' contacts nearly the spring element 27. When the merchant or other closes the terminal 1, he has to exert a little pressure to the cover 9 to pass this resistance point being the same as when he begins to close the cover 9. After this resistance point is passed, the lower flat part 28' contacts completely the spring element 27 thereby maintaining the cover in the closed position and providing a resistance to the rotation occurring during accidental opening.

For opening the terminal, the merchant or the like has to pass the resistance point corresponding to the end of the lower flat part 28'. When the lower flat part 28' of the protrusion 15 has a little rotated, the spring element 27 contacts the beginning of the circular part 29 of the protrusion 15. Then, the circular part 29 of the protrusion 15 glides upon the spring element 27 due to its shape and the cover closes relatively freely.

At the end of the opening movement, when the circular part 29 is ended, the upper flat part 28 contacts nearly the spring element 27. When the merchant or other opens the terminal 1, he has to exert a little pressure to the cover 9 to pass this resistance point being the same as when he begins to open the cover 9. After this resistance point is passed, the upper flat part 28 contacts completely the spring element 27 thereby maintaining the cover 9 in the open position and providing a resistance to keep the shield in place when using the terminal 1.

Such a terminal is for example a debit/credit card payment device. The terminal provided, according to the invention, is as practical for a countertop terminal as for a portable terminal. Further, the terminal according to the invention also comprises means to establish a communication with a server as it is impossible otherwise to use the terminal for bank transaction.

Although the preferred embodiments of the invention have been disclosed for illustrative purpose, those skilled in the art will appreciate that various modifications, additions or substitutions are possible, without departing from the scope and spirit of the invention as disclosed in the accompanying claims.

The invention claimed is:

1. Data entry terminal with manual validation, comprising at least a left lateral side and a right lateral side, a front wall and a back wall, an upper face and a lower face, said upper face consisting of a first portion and a second portion, said terminal further comprising means for reading a portable data support, means for manual validation of the data, said means for manual validation of the data being confined in said first portion of the upper face of the terminal, and a cover being pivotally mounted around a pivot axis between a first position and a second position, said first position being a position for protecting the means of validation from being seen by an unauthorised user and said second position being a closed position, said cover comprising at least a first and a second lateral side having each an internal and an external face, said cover further having a front wall having a first and a second edge, said first edge being substantially at the same level as the upper face of the terminal when the cover in said second position and the second edge being substantially at the same level as the lower face of the terminal when the cover is in the second position, said internal face of the first and of the second lateral side having each first engaging means provided to be each engaged in second corresponding engaging means being disposed each on said left and said right lateral side of said terminal, both first and both second engaging means being provided to be aligned together according said pivot axis to allow a mutual rotation around said pivot axis of the cover and of the terminal, characterised in that said cover is provided to rotate with an angle according to one of (a), (b), and (c):
    (a) more than 90°,
    (b) more than 145°,
    (c) around 180°,
    when rotating from said second position to be in said first position so that the first edge of the front wall is provided to be positioned above said second portion.

2. Data entry terminal according to claim 1, wherein the first edge of the front wall of the cover is provided to be positioned upon said second portion of the upper face of the terminal, in order to form a shield around said first portion.

3. Data entry terminal according to claim 1, wherein the means for reading a portable data support have a slot on said front wall of the terminal and wherein the second position of the cover is a position for protecting said means for reading a portable data support.

4. Data entry terminal according to claim 1, wherein said both first and both second engaging means are respectively situated in a most upper part of the lateral sides of the cover and of the terminal.

5. Data entry terminal according to claim 1, wherein at least one of said first engaging means is a groove for allowing a mutual translation movement between the cover and the terminal.

6. Data entry terminal according to claim 1, wherein at least one of the said second engaging means is a groove for allowing a mutual translation movement between the cover and the terminal.

7. Data entry terminal according to claim 5, wherein a protrusion is provided on an inner face of the front wall of said cover, said protrusion being provided to be inserted into said slot when the cover is in said second position.

8. Data entry terminal according to claim 1, wherein the distance between the first engaging means and the front wall of the cover is at least ½ of the distance between the front wall of the terminal and a rear end of the first portion of the terminal.

9. Data entry terminal according to claim 8, wherein the distance between the first engaging means and the front wall of the cover is exactly ½ of the distance between the front wall of the terminal and a rear end of the first portion of the terminal.

10. Data entry terminal according to claim 1, wherein, the lateral sides of the cover comprise each a front edge connected to said front wall, and a rear edge describing a quarter of circle, said quarter of circle being provided to allow the rotation of the cover, from the first position to the second position or inversely, without butting a surface upon which said terminal is placed.

11. Data entry terminal according to claim 10, wherein said rear edge describing a quarter of circle is provided to be engaged in a groove having a corresponding shape and being provided upon said lateral side of said terminal.

12. Data entry terminal according to claim 1, wherein a spring element is connected to said engaging means, said spring element being provided to allow the cover to stay engaged either in said first position or in said second position.

13. Data entry terminal with manual validation according to claim 1, wherein an opening mechanism is further provided to allow the cover to stay engaged either in said first open position or in said second closed position.

14. Data entry terminal according to claim 1, wherein the angle is more than 90°.

15. Data entry terminal according to claim 1, wherein the angle is more than 145°.

16. Data entry terminal according to claim 1, wherein the angle is around 180°.

17. Use of the data entry terminal of claim 1 with manual validation as a countertop terminal.

18. Use of the data entry terminal of claim 1 with manual validation as a portable terminal.

* * * * *